Feb. 28, 1961
J. J. LAWHON
2,972,913
PRECISION INDEXING DEVICE
Filed May 15, 1959
2 Sheets-Sheet 1
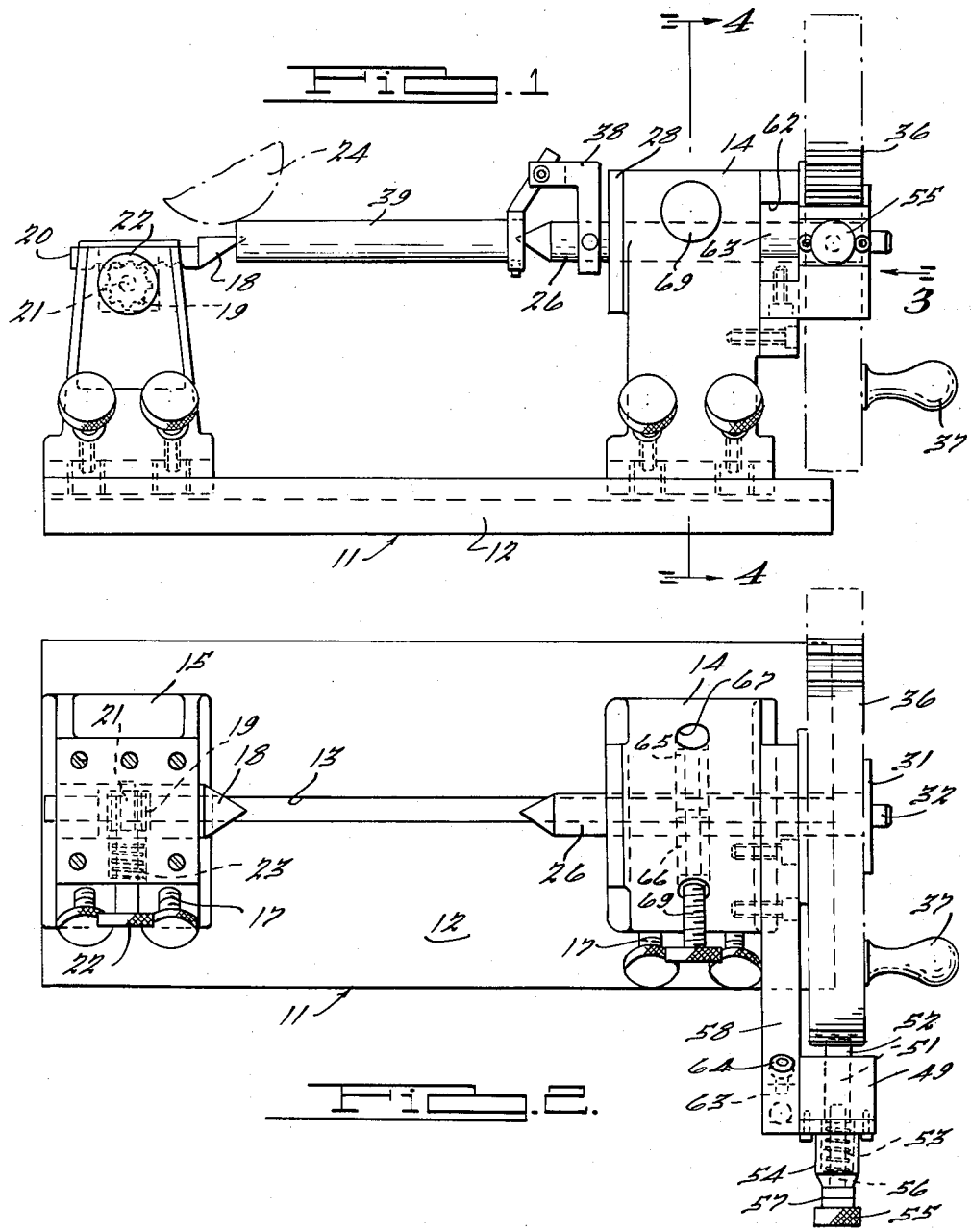
INVENTOR.
John J. Lawhon.
BY
Harness, Dickey & Pierce
ATTORNEYS.

Feb. 28, 1961  J. J. LAWHON  2,972,913
PRECISION INDEXING DEVICE
Filed May 15, 1959  2 Sheets-Sheet 2
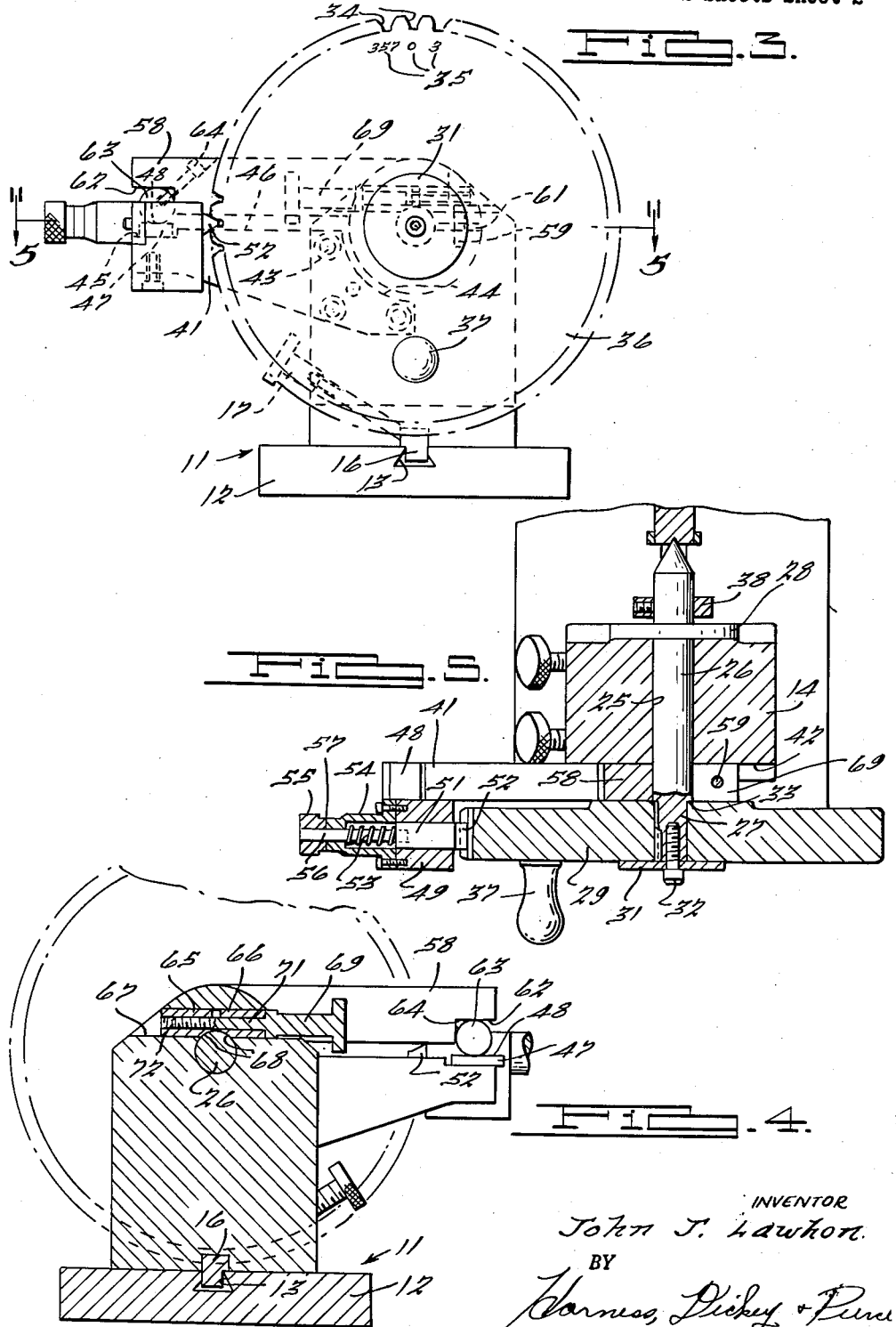
INVENTOR
John J. Lawhon.
BY
Harness, Dickey & Pierce
ATTORNEYS.

United States Patent Office 2,972,913
Patented Feb. 28, 1961

2,972,913

PRECISION INDEXING DEVICE

John James Lawhon, 19736 Rowe, Detroit, Mich., assignor of one-fourth to Lillian R. Lawhon, one-fourth to E. L. Saur, and one-fourth to James I. Skiver, all of Detroit, Mich.

Filed May 15, 1959, Ser. No. 813,424

5 Claims. (Cl. 74—815)

This invention relates to indexing apparatus, and more particularly to mechanisms for the precise angular indexing of work on centers, which is to be machined.

It is an object of the present invention to provide a novel and improved indexing device which permits the work to be precisely located in different angular positions with a minimum of manipulative effort on the part of the operator.

It is another object to provide an improved indexing device of this character having a large number of positions for positively locating the work without the use of gage blocks, thus reducing the time necessary for accurate indexing in many cases.

It is a further object to provide an improved indexing mechanism having the above characteristics, which greatly reduces the possibility of inadvertent shifting of the work while the parts are being locked in their indexed position.

It is also an object to provide an improved work indexing device of this nature which permits quick interchangability of centers of different types for various jobs.

Other objects, features, and advantages of the present invention will become apparent from the subsequent description, taken in conjunction with the accompanying drawings.

In the drawings:

Figure 1 is a side elevational view of the novel indexing mechanism showing a workpiece mounted therein;

Figure 2 is a top plan view of the mechanism showing the locations of the indexing wheel and its locking pawl;

Figure 3 is an end elevational view of the mechanism taken in the direction of the arrow 3 of Figure 1 and showing the sine bar and headstock locking means;

Figure 4 is a cross-sectional view taken along the line 4—4 of Figure 1 and showing the center locking means; and Figure 5 is a fragmentary plan cross-sectional view taken along the line 5—5 of Figure 3 and showing the means for mounting the indexing wheel on the center.

In general terms, the invention comprises a base having a headstock and a tailstock mounted for relative longitudinal movement thereon. A center is rotatably supported by the headstock and has an indexing wheel secured thereto, this wheel having a large number of notches around its periphery. A pawl is slidably mounted adjacent the wheel so as to be lockable in any selected notch, thereby accurately positioning the center in a desired index position. A sine bar is rotatably mounted on the center, and the outer end of this bar carries means for cooperating with a flat surface in a plane parallel to the center axis. Should it be desired to locate the work in an indexed position intermediate two notches on the wheel, the sine bar is locked to the center while the wheel is held in the nearest position to that desired. The pawl is then withdrawn and the sine bar raised so that the proper number of gage blocks may be placed on the reference surface, the sine bar being brought back to rest on the gage blocks. Means are provided for locking the center in position, this locking means being remote from the sine bar so that the latter is not disturbed during the locking operation. The means for securing the index wheel to the center is such that the center may be removed and replaced by another type when desired.

Referring more particularly to the drawings, the novel indexing mechanism is generally indicated at 11 and comprises a flat base 12 of rectangular shape having a longitudinal dovetail groove 13 along the upper surface thereof. The upper surface is smoothly finished and supports a headstock 14 and a tailstock 15. Means are provided for locking the headstock and tailstock to the base in longitudinally adjusted positions, this means comprising blocks 16 fitting within groove 13 and engageable by set screws 17. It will be noted that the engagement of blocks 16 is such that they will be urged to one side of slot 13, thus accurately locating the headstock and tailstock regardless of the amount of wear in groove 13. Tailstock 15 carries a center 18 longitudinally shiftable by a gear 19 which meshes with a rack 20. Gear 19 is on a shaft 21 rotatable by a knob 22, a torsion spring 23 surrounding the shaft and urging center 18 to the right as shown in Figure 1. Tailstock 15 is preferably of the type which is in non-interfering relation with a tool such as that shown in dot-dash lines 24 in Figure 1.

Headstock 14 is provided with a bore 25 adapted to receive a center 26, as seen in Figure 5. The center is provided with a reduced portion 27 at the outer end thereof, so that when the center is inserted in bore 25 with face plate 28 engaging the inner end of the headstock, reduced portion 27 will extend from the opposite end of the headstock. An index wheel 29 is mounted on reduced portion 27 of center 26, and a locking plate 31 is securable to the end of center 26 by a screw 32 to hold wheel 29 in place against a shoulder 33 on the center, this shoulder being spaced from the adjacent surface of headstock 14.

Index wheel 29 is provided with a plurality of precisely spaced notches 34 on its peripheral surface as seen in Figure 3. In the illustrated embodiment, 120 notches are shown, these notches extending in an axial direction on the outer surface of the disc-shaped wheel and being spaced 3° apart. Preferably, indicia in the form of numeral markings indicated at 35 are provided on the outwardly facing surface 36 of the wheel for reference purposes. Notches 34 are shown as being of outwardly flared shape with an included angle of approximately 30°, and the diameter of wheel 29 is substantially larger than the width of headstock 14 so that the size and spacing of notches 34 are ample. A handle 37 is secured to surface 36 of wheel 29 so that the wheel together with center 26 may be manually rotated. A dog 38 is securable to the inner end of center 26 for engagement with a workpiece 39 to be rotated.

An arm 41 is secured to the outer surface 42 of headstock 14 and extends outwardly therefrom, as seen in Figures 3 and 4. The inner end of arm 41 is somewhat wider than the outer end and is attached to the headstock by bolts 43, an arcuate clearance recess 44 being formed on the arm for purposes indicated below. The outer end of arm 41 has a recessed portion 45 in the horizontally extending edge 46 thereof, and a locating plate 47 is disposed in this recess and secured to arm 41.

The upper finished surface 48 of plate 47 is in a horizontal plane which is so located with respect to a horizontal plane passing through the center axis as to permit different combinations of gage blocks (not shown) to be placed thereon for cooperation with a sine bar, as described below.

A bracket 49 is secured to the outer end of arm 41 and extends laterally therefrom, and a pawl 51 is slidably mounted in bracket 49 and has a tapered end 52 engageable in any selected notch 34. Pawl 51 is urged toward wheel 29 by a helical spring 53 disposed within a housing 54, and a knob 55 is secured to the pawl by a rod 56 which extends through spring 53. Pawl 51 is withdrawable from its extended position as shown in Figure 5 and is rotatable by knob 55, the knob and housing having cooperating notched surfaces 57 which will hold pawl 51 in its retracted position when it is rotated from the position of Figure 5.

A sine bar 58 is mounted on center 26 between wheel 29 and headstock 14 and above arm 41. The inner end of sine bar 58 is enlarged for mounting on center 26, this enlarged portion being accommodated by recessed portion 44 of arm 41. The sine bar is rotatably mounted on center 26 but is lockable thereto by means of a set screw 59 which passes through a split portion 61 of the sine bar. Shoulder 33 is so spaced relative to headstock surface 42 as to permit rotation of sine bar 58 when the latter is disconnected from center 26. The outer end of sine bar 58 is recessed at 62 and carries a cylindrical engaging member 63 which is fastened thereto by a bolt 64. Member 63 is engageable with surface 48 of platform 47 to define an initial position for sine bar 58, and is engageable likewise with the top of a stack of gage blocks when the latter are placed on the platform.

Means are provided for locking center 26 in any selected position, this means comprising a pair of locking shoes 65 and 66 slidably mounted in a bore 67 extending transversely through headstock 14 above center 26. Shoes 65 and 66 are disposed on opposite sides of center 26 and an arcuate surface 68 of each shoe is engageable with the upper portion of the center to frictionally hold it against rotation. A set screw 69 is provided for adjusting shoes 65 and 66. This screw having an unthreaded shouldered portion 71 passing through shoe 66 and a threaded portion 72 disposed within shoe 65. It will thus be seen that rotation of set screw 69 in one direction will cause the shoes to advance toward each other to lock center 26 in place whereas rotation of the set screw in the opposite direction will release the center.

In operation of the indexing mechanism, the workpiece 39 will be placed between centers 18 and 26 and connected to dog 38. To perform a machining operation with the workpiece in a first rotational position, center 26 will be locked by shoes 65 and 66 with pawl 51 in any selected notch 34, sine bar 58 being disconnected from the center. Let it be assumed that after the first machining operation has taken place it is desired to perform an operation on workpiece 39 in a second angular position. If the two positions are spaced apart by an angle which is a multiple of 3°, the second position may be accurately obtained by withdrawing pawl 51 from wheel 39, releasing center 26 by rotation of set screw 69 and rotating the wheel and center until the proper notch 34 is aligned with pawl 51, after which the pawl may be reinserted in this notch. Indicia 35 may be used in determining the notch 34 into which pawl 51 is to be reinserted.

If the angular distance between the two positions is not a multiple of 3°, the second position may be obtained by the use of sine bar 58. In carrying out this procedure, wheel 29 will first be rotated as before to the closest position to that desired. For example, let us assume that the first machining operation took place with pawl 51 in a notch 34 marked zero (0), and that the included angle between the two positions is 20° 15'. After withdrawal of pawl 51, wheel 29 will be rotated counterclockwise as seen in Figure 3 until a notch marked 21° is aligned with pawl 51, after which the pawl will be inserted in this notch. With member 63 engaging platform 47, sine bar 58 will be locked to center 26 by means of set screw 59. Since center 26 must be rotated clockwise 45' in order to be properly located, gage blocks sufficient for this purpose are selected. After withdrawing pawl 51 from notch 34, sine bar 58 will be lifted so that the gage blocks may be placed on platform 47. Center 26 and wheel 29 will of course rotate with the sine bar since the latter is locked to center 26. Member 63 is then brought to bear against the top of the gage block stack, and while so held, set screw 69 is rotated to lock center 26 in place. After the center has been locked in place, the operation to be performed on workpiece 39 may be carried out.

It will be observed that during the locking operation sine bar 58 will not be manipulated or handled in any way by the operator so that there will be no danger of the angular position of the parts being disturbed. This is quite important in fine machining or gage work, since the slightest shifting of sine bar 58 would result in great inaccuracy in the angular position of workpiece 39.

Should it be desired to rotate workpiece 39 continuously while a machining operation is taking place, this may be accomplished by withdrawing pawl 51, releasing sine bar 58, and rotating center 26 and wheel 29 by means of handle 37. It will be noted that due to the novel construction of the indexing mechanism, a variety of machining or other operations may be performed, with provision for extreme accuracy in positioning the workpiece at all times. Because of the large number of positions in which wheel 29 may be positively located by means of pawl 51, many operations may be carried out without use of sine bar 58. In this connection, it well be observed that the relatively steep taper of notches 34 will prevent inadvertent slipping out of pawl 51 during operation. Should it be desired to replace center 26 with a center of another type, this may be easily accomplished by removing set screw 32, retaining plate 31 and wheel 29.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an indexing mechanism, means for rotatably supporting a workpiece, an index wheel connected to said supporting means, a plurality of locating elements formed on said wheel, a stationarily mounted element movable into engagement with any one of said locating elements, a stationary platform, a sine bar rotatably mounted with respect to said wheel on a common axis therewith, means for selectively locking said sine bar to said supporting means and wheel, and means for locking said supporting means in stationary position independently of said sine bar.

2. In an indexing mechanism, a base, a headstock mounted on said base, a center rotatably mounted in said headstock and adapted to support a workpiece, an index wheel secured to said center, a plurality of equidistantly spaced locating elements formed on said wheel, a stationarily mounted locking member movable between a retracted position and a locking position in engagement with any selected locating element on said wheel, a stationary gage block platform, a sine bar rockably mounted on said center for cooperation with said platform, said sine bar being rockable independently of said locking member, means for locking said sine bar directly to said center, and means for locking said center against rotation relative to said headstock, said first and second locking means being independently operable.

3. The combination according to claim 2, said first mentioned locking means comprising a split portion on said sine bar surrounding said center, and a set screw extending through said split portion and threadably mounted in the sine bar.

4. The combination according to claim 2, said last-mentioned locking means comprising a transverse bore in said headstock, a pair of locking shoes slidably disposed in said bore, said shoes being movable between a released position and a locking position in engagement with said center, and a set screw for moving said shoes between said positions.

5. In an indexing mechanism, a base, a headstock mounted on said base, a center rotatably mounted in said headstock, a shouldered reduced portion at the outer end of said center, an index wheel mounted on said reduced portion and engaging said shoulder, a retaining member secured to the outer end of said center and engageable with said index wheel to hold the index wheel against said shoulder and in non-rotatable position on said center, 120 equidistantly spaced notches on the periphery of said wheel, an arm secured to said headstock and extending to one side thereof, a pawl slidably mounted on said arm and movable between a retracted position and a position in a selected one of said notches to hold the wheel against rotation, a gage block platform carried by said arm, a sine bar having a split portion rotatably mounted on said center and an outer end engageable with said platform, a set screw extending through said split portion for locking said sine bar to said center, and means carried by said headstock for locking said center against rotation relative to the headstock in any selected angular position.

References Cited in the file of this patent

UNITED STATES PATENTS 2,386,880     Osplack ---------------- Oct. 16, 1945